(12) United States Patent
Kiyota

(10) Patent No.: US 9,251,084 B2
(45) Date of Patent: *Feb. 2, 2016

(54) ARITHMETIC PROCESSING APPARATUS, AND CACHE MEMORY CONTROL DEVICE AND CACHE MEMORY CONTROL METHOD

(71) Applicant: FUJITSU LIMITED, Kawasaki-shi, Kanagawa (JP)

(72) Inventor: Naohiro Kiyota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

This patent is subject to a terminal disclaimer.

(21) Appl. No.: 13/873,539

(22) Filed: Apr. 30, 2013

(65) Prior Publication Data
US 2013/0346730 A1    Dec. 26, 2013

(30) Foreign Application Priority Data

Jun. 26, 2012 (JP) ................................. 2012-143237

(51) Int. Cl.
G06F 12/08 (2006.01)
G06F 9/38 (2006.01)

(52) U.S. Cl.
CPC .......... G06F 12/0875 (2013.01); G06F 9/3834 (2013.01); G06F 9/3861 (2013.01)

(58) Field of Classification Search
CPC .............. G06F 12/0815; G06F 9/3834; G06F 12/0862; G06F 12/0811; G06F 12/0828; G06F 12/1027; G06F 9/3859; G06F 12/0808; G06F 12/0817; G06F 12/0842; G06F 12/0875; G06F 9/3861; G06F 9/3855; G06F 12/084; G06F 2212/6022; G06F 2212/621; G06F 12/0844

USPC ................. 711/141, 146, 117, 118, 119, 154, 711/E12.024, E12.026, E12.057

See application file for complete search history.

(56) References Cited

U.S. PATENT DOCUMENTS

| 8,549,232 B2 * | 10/2013 | Kiyota | 711/141 |
| 2004/0168046 A1 * | 8/2004 | Teruyama | 712/228 |
| 2005/0210204 A1 * | 9/2005 | Yamazaki | 711/145 |
| 2006/0026594 A1 * | 2/2006 | Yoshida et al. | 718/100 |
| 2011/0161594 A1 * | 6/2011 | Kiyota | 711/125 |

FOREIGN PATENT DOCUMENTS

| JP | 6-214875 | 8/1994 |
| JP | 2004-5710 | 1/2004 |
| JP | 4180569 | 11/2008 |
| JP | 2011-134205 | 7/2011 |

* cited by examiner

Primary Examiner — Zhuo Li
(74) Attorney, Agent, or Firm — Staas & Halsey LLP

(57) ABSTRACT

An arithmetic processing apparatus includes a plurality of processors, each of the processors having an arithmetic unit and a cache memory. The processor includes an instruction port that holds a plurality of instructions accessing data of the cache memory, a first determination unit that validates a first flag when receiving an invalidation request for data in the cache memory, a cache index of a target address and a way ID of the received request match with a cache index of a designated address and a way ID of the load instruction, a second determination unit that validates a second flag when target data is transmitted due to a cache miss, and an instruction re-execution determination unit that instructs re-execution of an instruction subsequent to the load instruction when both the first flag and the second flag are validated at the time of completion of an instruction in the instruction port.

9 Claims, 18 Drawing Sheets

FIG. 1
RELATED ART

| ORDER OF INSTRUCTIONS ↓ | (1) load ↰ load  NG | (2) load ↰ store  NG | (3) store ↰ load  GOOD | (4) store ↰ store  NG |
|---|---|---|---|---|

FIG. 6

| valid | status | opcode | address | RIM | RIF |

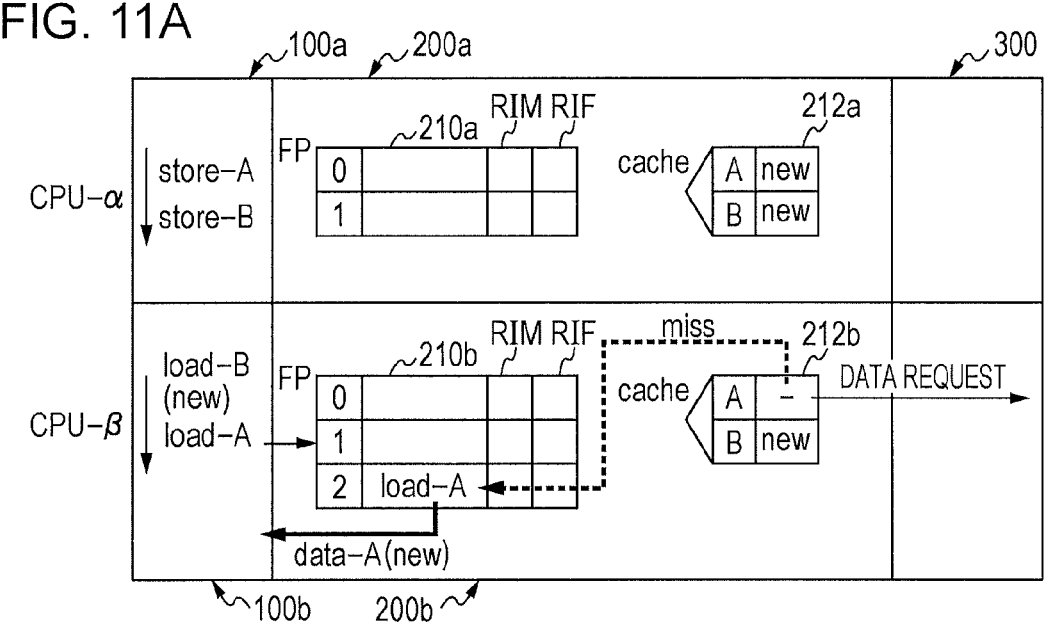
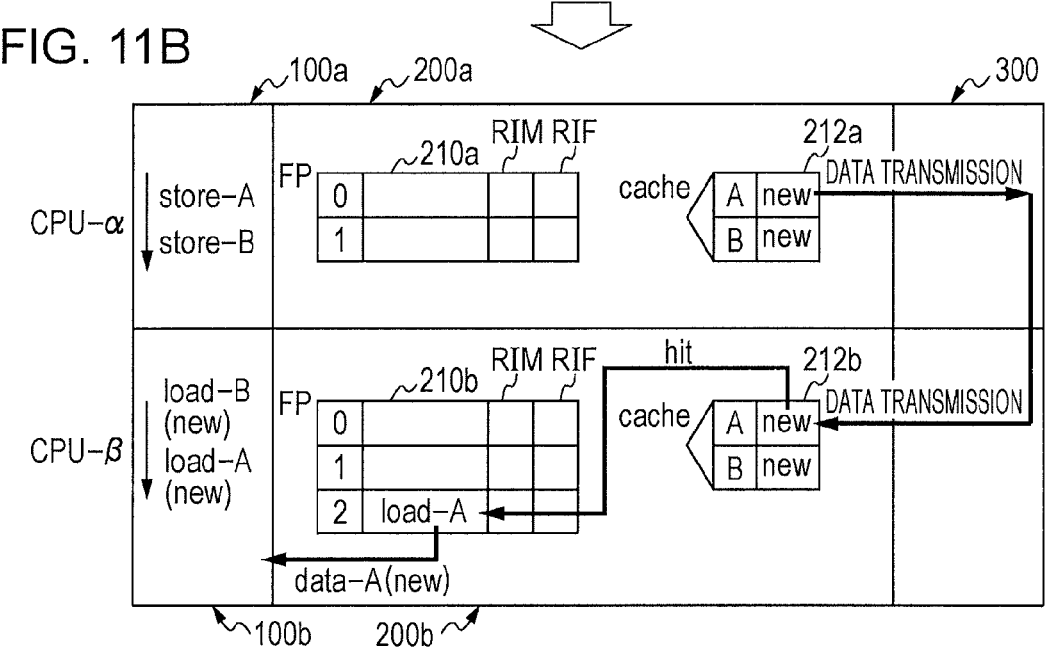

FROM FIG. 14A

ARITHMETIC PROCESSING APPARATUS, AND CACHE MEMORY CONTROL DEVICE AND CACHE MEMORY CONTROL METHOD

CROSS-REFERENCE TO RELATED APPLICATION

This application is based upon and claims the benefit of priority of the prior Japanese Patent Application No. 2012-143237, filed on Jun. 26, 2012, the entire contents of which are incorporated herein by reference.

FIELD

The embodiment discussed herein is related to an arithmetic processing apparatus, a cache memory control device, and a cache memory control method.

BACKGROUND

In a processor serving as an arithmetic processing apparatus, which is currently commonly used, an out-of-order process is employed in order to maintain the consistency at a degree higher than that in the related art to run an instruction. The out-of-order process refers to a process of executing, while reading of data for a preceding instruction is delayed due to a cache miss or the like, reading of data for a subsequent instruction, and then executing reading of the data for the preceding instruction.

However, if this process is performed, there may be a case in which the latest data is read in the reading executed by the subsequent instruction and old data is read in the reading executed by the preceding instruction, and thus may result in the violation of total store ordering (TSO).

Here, the TSO indicates that a reading result of data correctly reflects a data writing order and secures consistency of an execution order. The TSO is one of memory ordering rules which specifies the constraints in replacement of an order of data to be actually written in a memory with respect to an order of instructions accessing the memory. The TSO rule includes the following three. A load instruction may not be processed so as to bypass a preceding load instruction; a store instruction may not be processed so as to bypass a preceding load instruction and a preceding store instruction; and an atomic load/store instruction may not be processed so as to bypass a preceding load instruction and a preceding store instruction.

That is to say, as illustrated in FIG. 1, a load instruction (load) may be processed so as to bypass a preceding store instruction (store) but in the other patterns it is inhibited from bypassing an instruction. However, in a case where target data of a load instruction is included in target data of a preceding store instruction, the corresponding load instruction loads the data of the store instruction.

Here, a processor (a CPU or a CPU-CORE) which processes memory access out of order enables a load instruction to return data to an instruction control unit before a preceding load instruction is executed. As illustrated in FIG. 2, in an arithmetic processing apparatus including an instruction control unit 100, and a primary cache control unit 200 which accesses a cache memory in response to a memory access request from the instruction control unit 100, the subsequent process is performed. For example, in a case where cache miss occurs in relation to target data of a preceding load instruction (load-A) and cache hit occurs in relation to target data of a subsequent load instruction (load-B), the primary cache control unit 200 returns the data of the subsequent load instruction (load-B) to the instruction control unit 100 so as to bypass the preceding load instruction (load-A).

However, actual instruction execution is performed according to an order of instructions. Therefore, when TSO between a load instruction and a store instruction is kept, even if load data is read out of order, it seems that TSO can be kept in software of an arithmetic processing apparatus with a single processor configuration. However, when another process invalidates target data of a subsequent load instruction in response to a store instruction in an arithmetic processing apparatus with a multi-processor configuration, there are cases where TSO violation between load instructions is found in software. In other words, there are cases where read data of the preceding load instruction become new data after execution of the store instruction regardless of read data of the subsequent load instruction being old data before execution of the store instruction and thus bypassing inhibition between load instructions of TSO is violated.

In order to avoid this, a subsequent load instruction may be re-executed in a case where there is a possibility that TSO may be violated. That is to say, when there is a subsequent load instruction which bypasses a preceding load instruction and returns data, the target data is invalidated such that another processor uses target data of the subsequent load instruction, and thus a processor of interest stores the target data being invalidated. In addition, when the preceding load instruction makes data read, the instruction control unit 100 may be notified that there is a possibility that TSO may be violated, and instructions after the next instruction (the subsequent load instruction) may be re-executed.

However, if whether or not there is a possibility of TSO violation is determined based on whether or not there is an invalidation request, there are cases where it is determined that there is a possibility of TSO violation even though TSO is not inherently violated. If this determination is performed, an instruction re-execution process is unnecessarily performed, which is thus a factor of considerably reducing a performance.

Japanese Patent No. 4180569, Japanese Laid-open Patent Publication Nos. 2011-134205 and 6-214875 are examples of the related art.

SUMMARY

According to an aspect of the invention, an arithmetic processing apparatus includes a plurality of processors, each of the processors having an arithmetic unit and a cache memory. The processor includes an instruction port that holds a plurality of instructions accessing data of the cache memory, a first determination unit that validates a first flag when receiving an invalidation request for data in the cache memory, a cache index of a target address and a way ID of the received request match with a cache index of a designated address and a way ID of the load instruction, a second determination unit that validates a second flag when target data is transmitted due to a cache miss, and an instruction re-execution determination unit that instructs re-execution of an instruction subsequent to the load instruction when both the first flag and the second flag are validated at the time of completion of an instruction in the instruction port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a general TSO rule;

FIG. 6 is a diagram illustrating an example of the format of each entry in the fetch port in the primary cache control unit;

FIGS. 11A and 11B are diagrams illustrating an example of the TSO violation avoiding operation performed by the primary cache control unit in the multi-processor configuration;

DESCRIPTION OF EMBODIMENT

Figure 2:
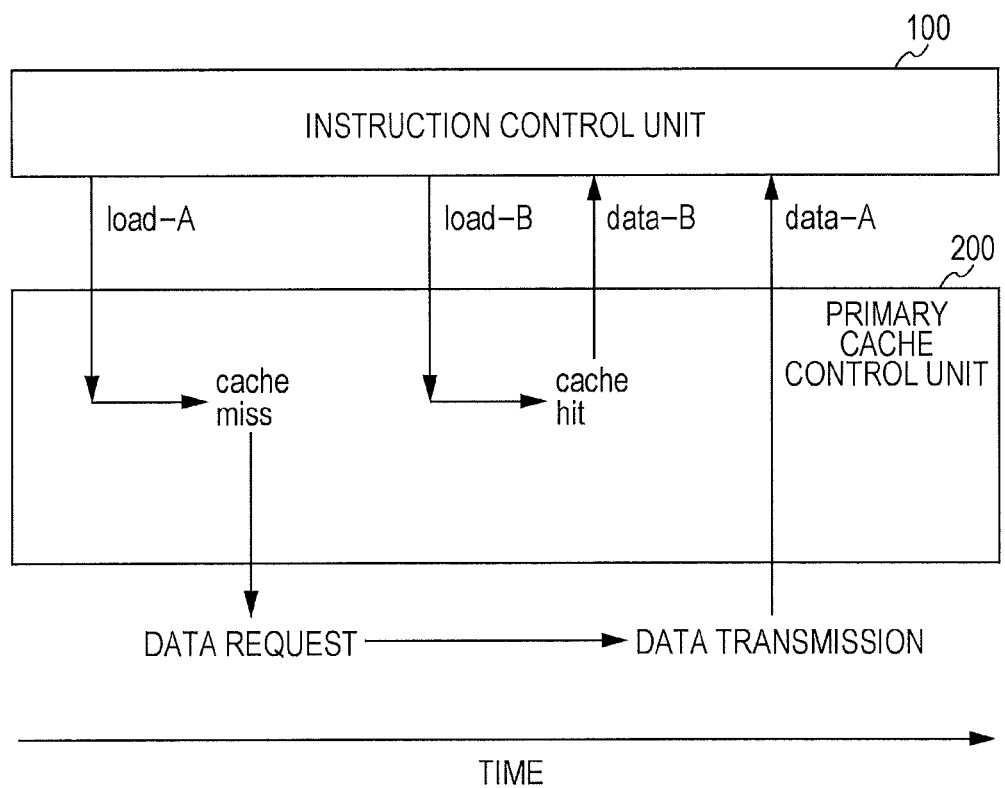
FIG. 2 is a diagram illustrating an example in which load instructions bypass each other in a processor which performs an out-of-order process.
Figure 3A:
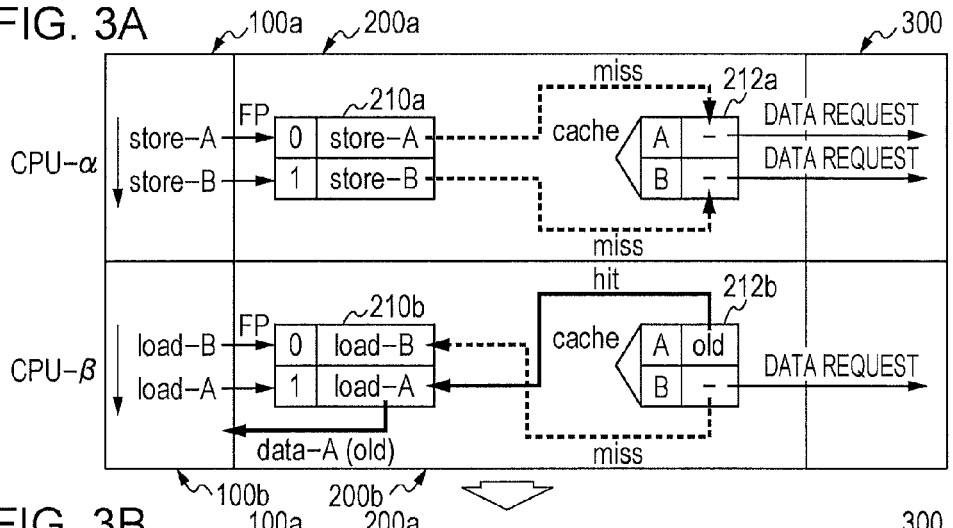
FIGS. 3A to 3C are diagrams illustrating an example of the TSO violation in a multi-processor configuration.
Figure 3B:
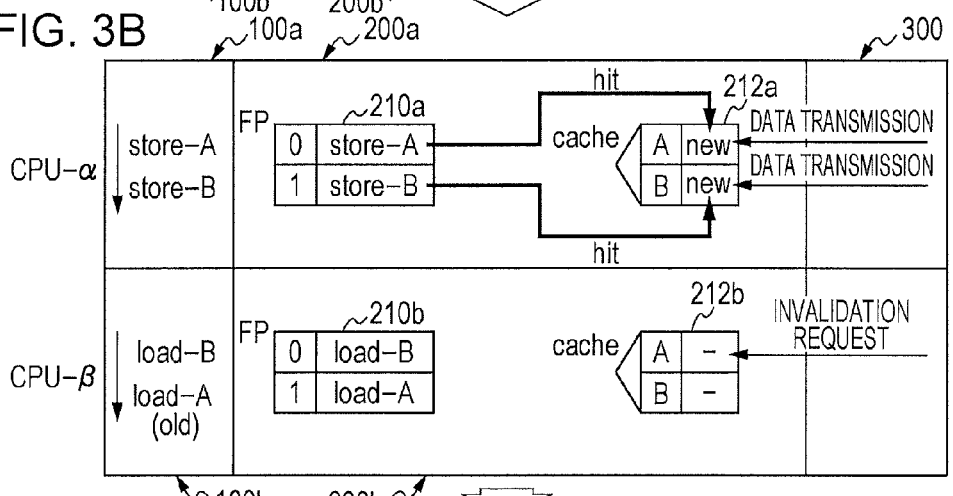
Figure 3C:
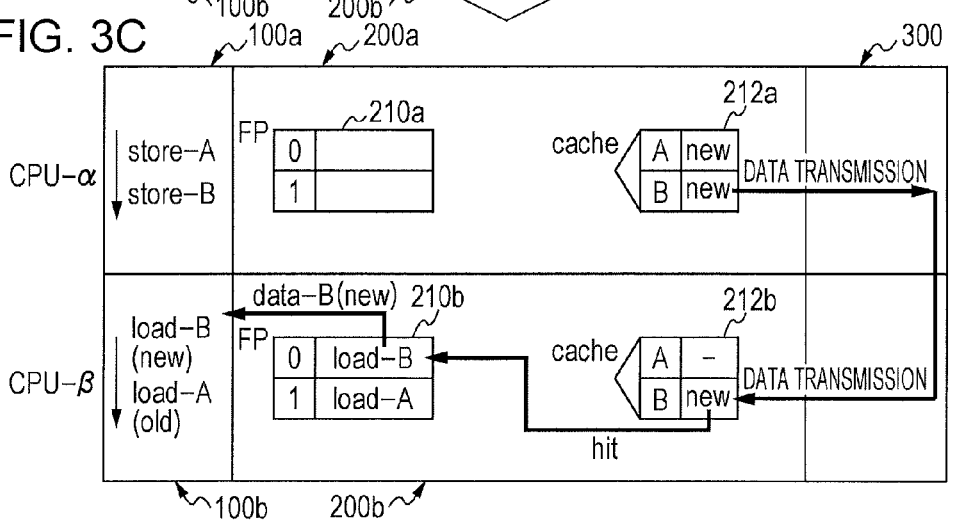

FIGS. 3A to 3C are diagrams illustrating an example of the case where TSO violation between load instructions is found in software in an arithmetic processing apparatus with a multi-processor configuration (multi-core configuration). In the arithmetic processing apparatus illustrated in FIGS. 3A to 3C, a CPU-α (a CPU core) and a CPU-β (a CPU core) respectively include instruction control units $100a$ and $100b$, and primary cache control units $200a$ and $200b$. In addition, the CPU-β and the CPU-β commonly use a secondary cache control unit 300 of a lower hierarchy. In FIGS. 3A to 3B, fetch ports (FPs) $210a$ and $210b$ are instruction ports which hold instructions accessing data of a cache memory, and, in these FPs, the instructions are respectively held in entries specified by the FP numbers 0 and 1. Further, hereinafter, when the instruction control units $100a$ and $100b$ and the like are referred to, in a case where the CPU-α side and the CPU-β side do not have to be differentiated, the letters a and b of the end are omitted, and only the leading reference numeral ("100" or the like) may be used.

In FIGS. 3A to 3C, in the processor CPU-α, store instructions store-A and store-B are issued in this order in relation to data of regions (indexes) of a cache memory (cache) $212a$. In addition, in the processor CPU-β, load instructions load-A and load-B are issued in this order in relation to data of regions (indexes) of a cache memory (cache) $212b$.

As illustrated in FIG. 3A, in the primary cache control unit $200a$ of the CPU-α, both the instructions store-A and store-B undergo cache misses, and data is requested to the secondary cache control unit 300. In addition, in the primary cache control unit $200b$ of the CPU-β, the instruction load-B undergoes a cache miss. The instruction load-A performs cache hit and bypasses the instruction load-B such that target data, data-A (old), is returned to the instruction control unit $100b$ whilst target data of the instruction load-B might not be returned to the instruction control unit $100b$ due to the cache miss. In relation to the data of the region B where the instruction load-B undergoes the cache miss, the data is requested to the secondary cache control unit 300.

Next, as illustrated in FIG. 3B, an invalidation request for the cache memory $212b$ of the CPU-β is issued from the secondary cache control unit 300 in response to the previous data request regarding the instruction store-A from the CPU-α to the secondary cache control unit 300. In other words, in order to satisfy a desire for exclusively holding data between CPUs, the data of the region A to be sent to the CPU-α is invalidated in the CPU-β side and thus is not available. After the invalidation request, the two store instructions store-A and store-B of the CPUs are processed in this order.

Next, as illustrated in FIG. 3C, the data of the region B which has been stored is sent to the CPU-β from the CPU-α. The instruction load-B is processed in the CPU-β, and thereby data-B (new) which has been stored by the CPU-α is returned to the instruction control unit $100b$.

As a result, although the two store instructions store-A and store-B are issued in this order in the CPU-α, the data-B (new) after being stored is returned in response to the instruction load-B and the data-A (old) before being stored is returned in response to the instruction load-A in the CPU-β. That is to say, an instruction process in the CPU-β consequently violates bypassing inhibition between load instructions of TSO.

In order to avoid this, a subsequent load instruction is re-executed in a case where there is a possibility that TSO may be violated. That is to say, when there is a subsequent load instruction which bypasses a preceding load instruction and returns data, in a case where target data is invalidated such that another processor uses target data of the subsequent load instruction, a processor of interest stores the fact. In addition, when the preceding load instruction makes data read, the instruction control unit 100 may be notified that there is a possibility that TSO may be violated, and instructions after the next instruction (the subsequent load instruction) may be re-executed.

For example, in a case where the instruction load-A is processed so as to bypass the instruction load-B and then data of the region A is requested to be invalidated, a signal (flag) indicating the fact is validated. Successively, if the signal (flag) is valid when the instruction load-B is processed and the data is returned, the instruction control unit $100b$ is notified that there is a possibility of TSO violation between the load instructions. The instruction control unit $100b$ reissues the instruction load-A in response to the notification, and thus data which is returned thereafter by the instruction load-A reflects the instruction store-A in the CPU-α, thereby avoiding TSO violation.

Hereinafter, first, a basic operation of a configuration for avoiding TSO violation through instruction re-execution will be described.

Figure 4:
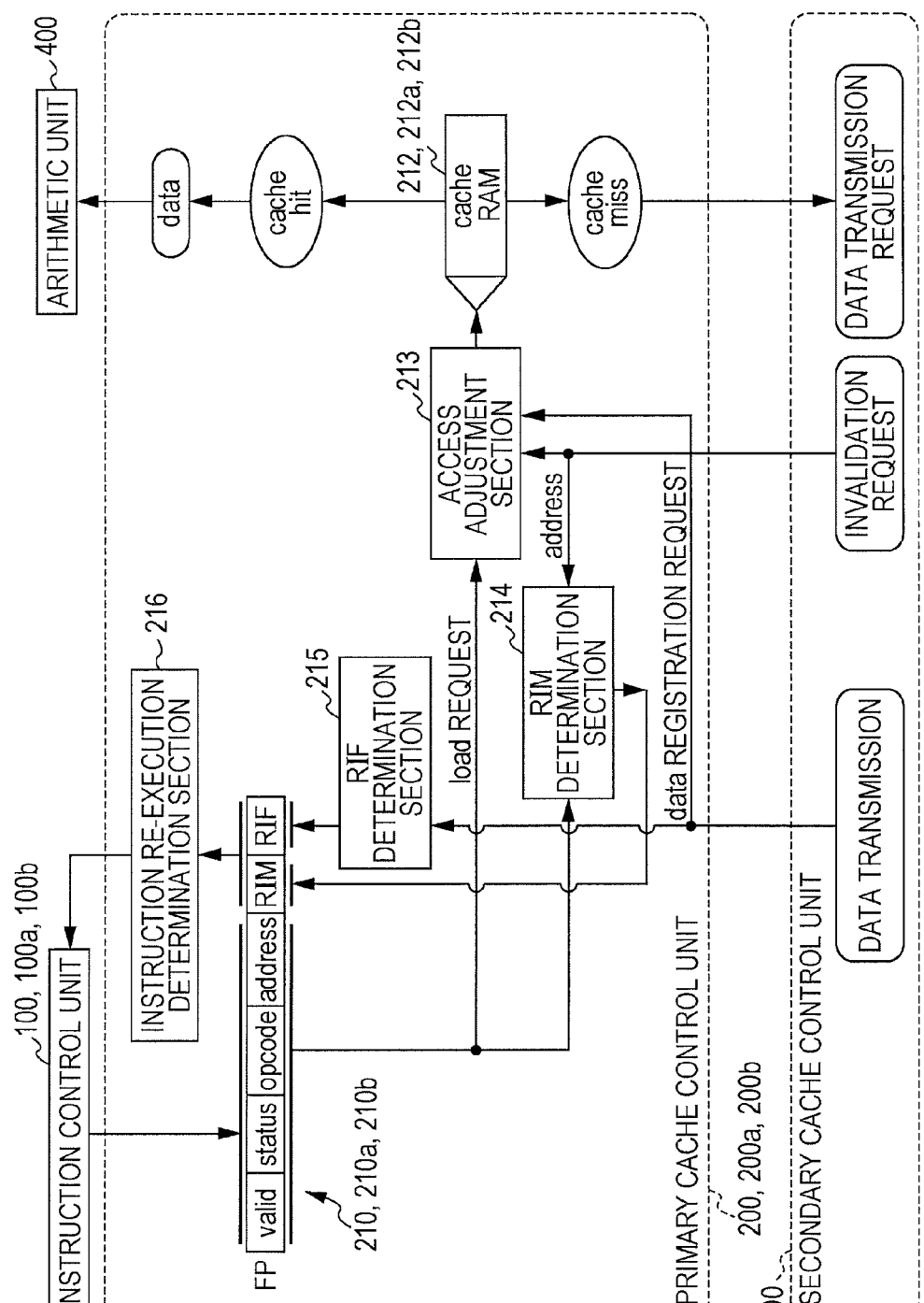
FIG. 4 is a block diagram illustrating an example of the configuration of a primary cache control unit having a function of avoiding TSO violation.
Figure 5:
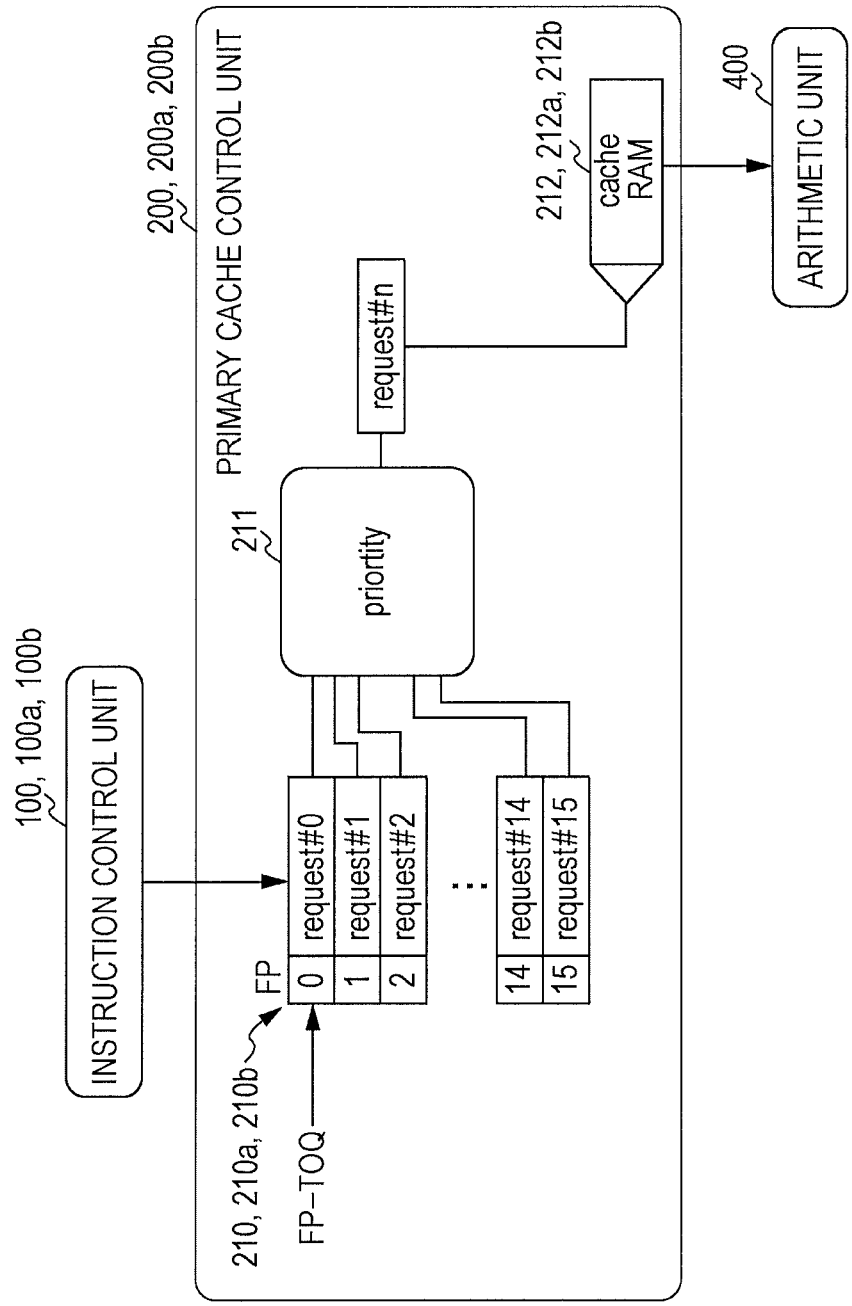
FIG. 5 is a block diagram illustrating an example of the configuration related to a fetch port in the primary cache control unit.
Figure 6:
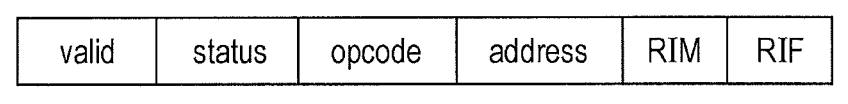

FIG. 4 is a block diagram illustrating an example of the configuration of the primary cache control unit 200 having a function of avoiding TSO violation. FIG. 5 is a block diagram illustrating an example of the configuration related to the fetch port (FP) 210 in the primary cache control unit 200 illustrated in FIG. 4. FIG. 6 is a diagram illustrating an example of the format of each entry in the FP 210 of the primary cache control unit 200 illustrated in FIG. 4.

Requests for cache access from the instruction control unit 100 are temporarily held in the FP 210 of the primary cache control unit 200. FIG. 5 illustrates an example of the configuration related to this FP 210. The requests are respectively allocated to the entries of the FP 210 according to an order on a program and are stored in the entries, and, the respective entries of the FP 210 are circularly used. For example, in a case where the FP 210 has sixteen entries, requests from the instruction control unit are allocated in order from FP#0, and are allocated to FP#0 after FP#15. In addition, in some cases, FP#n (where n=0 to 15) is referred to as an FP number by specifying one entry in the FP 210.

The FP 210 is provided with a priority section 211 as illustrated in FIG. 5. The priority section 211 adjusts a request (request#0 to request#15) of which entry in the FP 210 is processed. In order to guarantee the above-described TSO, the priority section 211 guarantees that a subsequent store instruction does not bypass a preceding load instruction in an order of instructions to be processed, or a subsequent store instruction does not bypass a preceding store instruction, and enables a subsequent load instruction to bypass a preceding load instruction. In addition, the priority section 211 selects the entries (request#n) of the FP 210 one by one out of order, that is, at random, and makes a process of the instruction executed. Further, the respective entries of the FP 210 are sequentially released in chronological order from the oldest entry. Here, the oldest entry of the valid entries is indicated by fetch-port-top-of-queue (FP-TOQ). In other words, an entry of the FP 210 which is not indicated by the FP-TOQ is not directly released even if a process of an instruction in the entry is completed. In addition, an entry which has been processed is released in an old order from an entry indicated by the FP-TOQ at a time point when a process of an instruction in the entry indicated by the FP-TOQ is completed.

FIG. 6 illustrates a format of each entry, that is, content of each entry. As illustrated in FIG. 6, each entry of the FP 210 holds "valid", "status", "opcode", "address", "RIM", and "RIF". The "valid" is a flag indicating whether or not the entry is valid. The "status" is a flag indicating whether or not a process of the cache access request held in the entry is completed. The "opcode" indicates a type (load or store) of cache access request held in the entry. The "address" indicates an address of the cache access request held in the entry. The "RIM" and "RIF" are flags used for TSO guarantee control. The RIM flag is validated in a case where target data is ejected from the cache memory 212 by an invalidation request received after the target data is transmitted to an arithmetic unit 400 by a load instruction held in a certain entry until the entry is released. The validation of the RIM flag is performed by a RIM determination section 214 described later. The RIM flag is an example of the "first flag". The RIF flag is validated by a RIF determination section 215 described later in a case where the target data of a load instruction is transmitted after the load instruction held in a certain entry undergoes a cache miss. The RIF flag is an example of the "second flag".

With reference to FIG. 4, detailed configuration and operation of the primary cache control unit 200 having the FP 210 or the priority section 211 configured in this way will be described. The primary cache control unit 200 illustrated in FIG. 4 has a configuration for realizing an instruction re-execution request in order to guarantee TSO, and, more specifically, has a function of avoiding TSO violation illustrated in FIGS. 3A to 3C.

As illustrated in FIG. 4, the primary cache control unit 200 is connected to the instruction control unit 100 and the arithmetic unit 400, and is also connected to the secondary cache control unit 300. The primary cache control unit 200 includes the cache memory (cache RAM) 212, an access adjustment section 213, the RIM determination section 214, the RIF determination section 215, and an instruction re-execution determination section 216, in addition to the FP 210 or the priority section 211 described with reference to FIG. 5. In addition, for convenience, in FIG. 4, only a single entry of the FP 210 including a plurality of entries is illustrated, and the priority section 211 is not illustrated.

The priority section 211 (refer to FIG. 5) selects a request (instruction) held in each entry of the FP 210 and accesses the cache memory 212 in order to process the selected request. At this time, the access adjustment section 213 adjusts access to the cache memory 212 in relation to the request selected by the priority section 211 and a data registration request or an invalidation request received from the secondary cache control unit 300. When the request from the FP 210 acquires priority through this adjustment in the access adjustment section 213, access to the cache memory 212 is performed so as to process the request. In a case where the request is a load request, for example, the cache memory 212 is searched for target data of the load request, and, if the target data is cache-hit, the corresponding data is transmitted to the arithmetic unit 400. On the other hand, if a cache miss occurs, a transmission request of the corresponding data is issued to the secondary cache control unit 300.

When a response of data transmission to the transmission request of the corresponding data is received from the secondary cache control unit 300, the primary cache control unit 200 sends a registration request of the corresponding data (data registration request) to the access adjustment section 213. In addition, when the registration request of the corresponding data acquires priority through the adjustment in the access adjustment section 213, the corresponding data is registered in the cache memory 212. Along therewith, information related to the registration request of the corresponding data from the secondary cache control unit 300 is sent to the RIF determination section 215. The RIF determination section 215 determines whether or not the RIF flag of the entry of the FP 210 is validated according to a method (steps S21 to S24) illustrated in FIG. 8 on the basis of the information related to the registration request.

That is to say, when data to be registered in the cache memory 212 is transmitted from the secondary cache control unit 300 (step S21), the RIF determination section 215 searches all the entries of the FP 210 (step S22). In addition, the RIF determination section 215 determines whether or not there is an entry of "valid=1", that is, a valid entry in the FP 210 (step S23). If there is a valid entry in the FP 210 (the YES route), the RIF flag is set to "1" in all the entries of the FP 210 from an entry indicated by the FP-TOQ to the valid entry (step S24). In other words, in a case where target data of a load instruction is transmitted from the communication processing unit 300 after the load instruction held in the entry undergoes a cache miss, the RIF determination section 215 validates an RIF flag of a target entry. In addition, if there is no valid entry in the FP 210 (the NO route in step S23), the RIF determination section 215 finishes the RIF determination process.

Referring to FIG. 4 again, when an invalidation request to the cache memory 212 is received from the secondary cache control unit 300, the primary cache control unit 200 sends the invalidation request to the access adjustment section 213. In addition, when the invalidation request from the secondary cache control unit 300 acquires priority through the adjustment in the access adjustment section 213, corresponding data of the cache memory 212 is invalidated. Along therewith, information related to the invalidation request from the secondary cache control unit 300 is sent to the RIM determination section 214. The RIM determination section 214 determines whether or not the RIM flag of the entry of the FP 210 is validated according to a method (steps S11 to S15) illustrated in FIG. 7 on the basis of the information related to the invalidation request.

In other words, when the invalidation request issued from the secondary cache control unit 300 (step S11) for the cache memory 212 is received, the RIM determination section 214 searches all the entries of the FP 210 (step S12). In addition, the RIM determination section 214 determines whether or not there is an entry of "valid=1", "status=completion", and "opcode=load system" in the FP 210 (step S13). That is to say, it is determined whether or not the invalidation request of target data of the cache memory 212 is received after the target data is transmitted from the cache memory 212 to the arithmetic unit 400 in response to a load instruction held in the FP 210 until the entry is released. If there is such an entry in the FP 210, the flow proceeds to the YES route of step S13. The RIM determination section 214 determines whether or not a cache index part of an address of the corresponding entry matches with a cache index part of a target address of the invalidation request received from the secondary cache control unit 300 (step S14). If both the addresses match with each other (the YES route of S14), the RIM determination section 214 sets the RIM flag to "1" for all the entries from an entry indicated by the FP-TOQ to the valid entry (step S15). In other words, there are cases where target data is ejected from the cache memory 212 by an invalidation request after the target data is transmitted to the arithmetic unit 400 by a load instruction held in a certain entry of the FP 210 until the entry is released. In these cases, the RIM determination section 214 validates the RIM flag of the corresponding entry. Further, if there is no target entry in the FP 210 (the NO route of step S13 or the NO route of step S14), the RIM determination section 214 finishes the RIM determination process.

Figure 9:
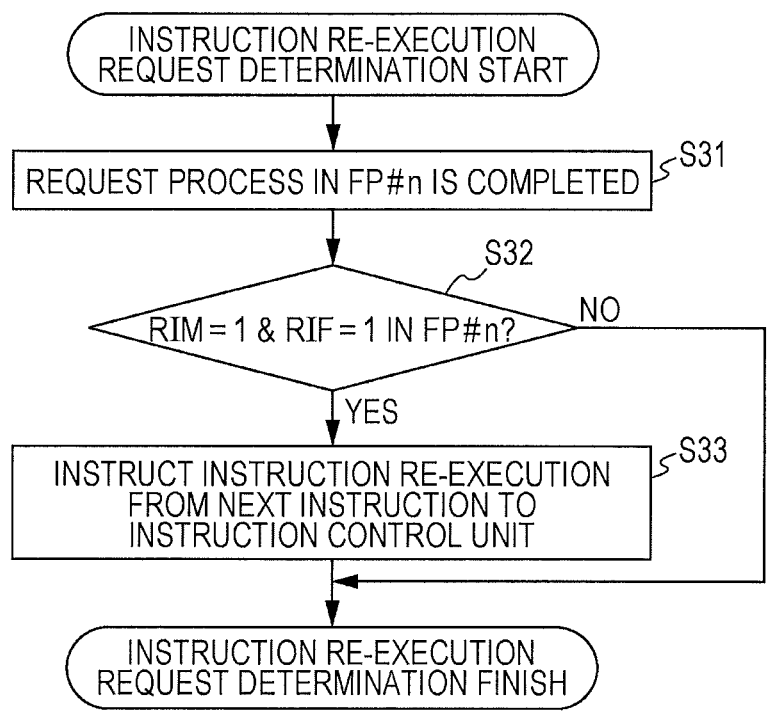
FIG. 9 is a method illustrating an operation example of an instruction re-execution determination section.

In addition, when a process of an instruction in each entry of the FP 210 is completed, the instruction re-execution determination section 216 refers to the RIM flag and the RIF flag of the entry and determines whether or not the instruction in the corresponding entry is re-executed according to a method (steps S31 to S33) illustrated in FIG. 9. In other words, when a process of a request in a certain entry (FP#n) of the FP 210 is completed (step S31), the instruction re-execution determination section 216 determines whether or not both the RIM flag and the RIF flag in the entry of FP#n are validated (step S32). That is to say, it is determined whether or not "RIM=1" and "RIF=1" (step S32). If both of them are validated (the YES route), the instruction re-execution determination section 216 issues an instruction re-execution request to the instruction control unit 100 in order to instruct instruction re-execution from a next instruction of the instruction corresponding to the entry. In addition, if it is determined that the determination in step S32 is negative (NO), the instruction re-execution determination section 216 finishes the determination process.

Next, with reference to FIGS. 10A to 10C, and FIGS. 11A and 11B, a description will be made of an operation of the primary cache control unit 200 for avoiding TSO violation illustrated in FIGS. 3A to 3C, that is, an operation of the instruction re-execution request for guaranteeing TSO. Here, FIGS. 10A to 10C and FIGS. 11A and 11B are diagrams illustrating an example of the TSO violation avoiding operation performed by the primary cache control unit 200 illustrated in FIG. 4 in a multi-processor configuration. In addition, in FIGS. 10A to 10C and FIGS. 11A and 11C as well, a store instruction and a load instruction are issued in the same manner as in the case illustrated in FIGS. 3A to 3C. In other words, in the processor CPU-α, store instructions store-A and store-B are issued in this order in relation to data of the regions of the cache memory 212a. In addition, in the processor CPU-β, load instructions load-A and load-B are issued in this order in relation to data of the regions of the cache memory 212b.

Figure 10A:
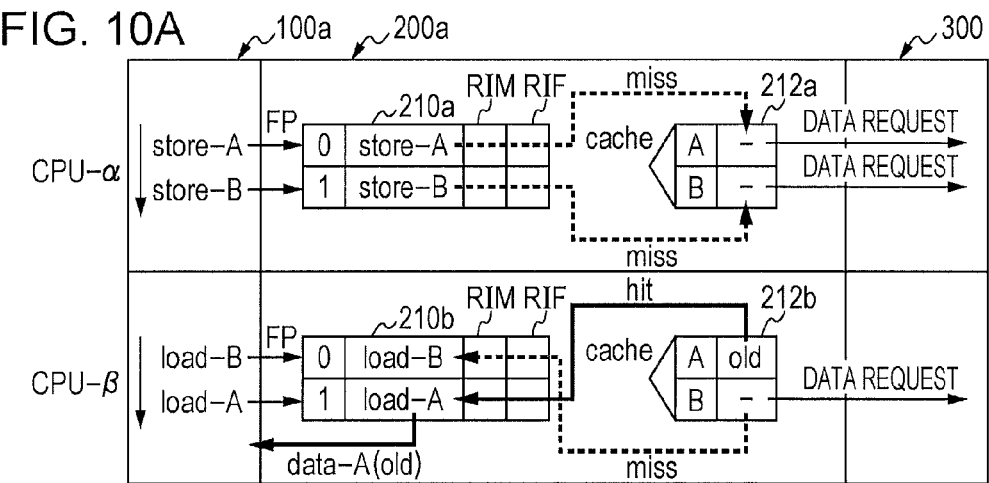
FIGS. 10A to 10C are diagrams illustrating an example of the TSO violation avoiding operation performed by the primary cache control unit in the multi-processor configuration.

As illustrated in FIG. 10A, in the CPU-β, when the load instructions are processed in order of the instructions load-B and load-A, in a case of FP-TOQ=0, the instruction load-B is set in the entry of FP#0, and the instruction load-A is set in the entry of FP#1. At this time, it is assumed that the instruction load-B undergoes a cache miss and thus the secondary cache control unit 300 is requested to transmit data of the region B. On the other hand, in a case where the instruction load-A performs a cache hit, the instruction load-A bypasses the instruction load-B, and thereby data data-A (old) is transmitted from the cache memory 212b to the arithmetic unit 400 (the instruction control unit 100b) so as to complete a process of the instruction load-A. In addition, as illustrated in FIG. 10A, in the CPU-α, when the store instructions are processed in order of the instructions store-A and store-B, the instruction store-A is set in the entry of FP#0, and the instruction store-B is set in the entry of FP#1. It is assumed that both the instructions store-A and store-B undergo cache misses and thus the secondary cache control unit 300 is requested to transmit data of the regions A and B.

Figure 10B:
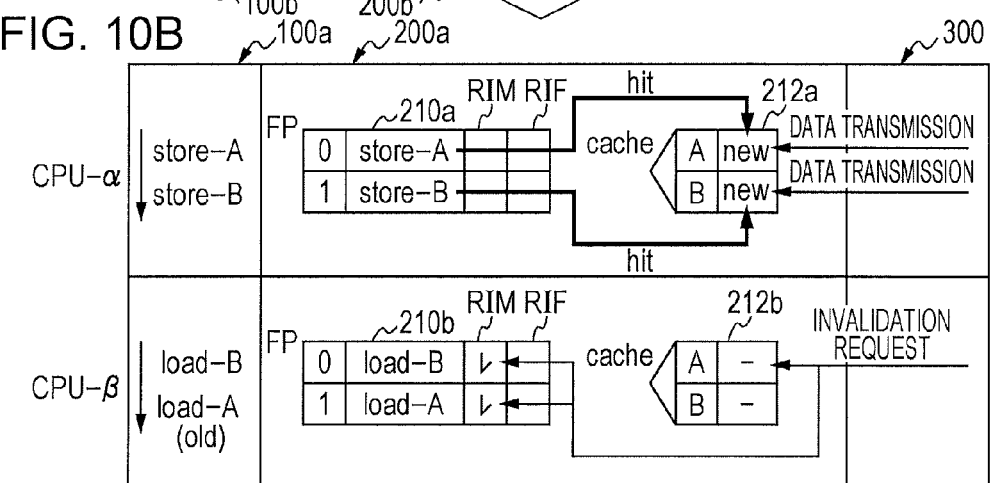

At this time, since the data (data-A (old)) corresponding to the instruction store-A is present in the CPU-β, as illustrated in FIG. 10B, an invalidation request is issued to the primary cache control unit 200b of the CPU-β from the secondary cache control unit 300. In other words, in order to satisfy a desire for exclusively holding data between the CPUs, the data of the region A to be sent to the CPU-α is invalidated in the CPU-β side and thus is not available. In addition, as illustrated in FIG. 10B, data corresponding to the instructions store-A and store-B is transmitted to the primary cache control unit 200a of the CPU-α and is registered in the cache memory 212a, and then the store instructions store-A and store-B are executed. Thereby, the regions A and B of the cache memory 212a are updated (data-A (new) and data-B (new)).

Further, at this time, as illustrated in FIG. 10B, in the primary cache control unit 200b of the CPU-β, the RIM flag of the entry of the FP 210b is validated by the function of the RIM determination section 214. That is to say, the RIM determination section 214 determines that an address of the cache index part of the load instruction of FP#1 of which a process has already been completed matches with an address of the cache index part of the invalidation process request. Based on this determination result, the RIM flag which indicates a possibility that the data (data-A (old)) may be updated by another CPU (here, the CPU-α) is validated.

Figure 10C:
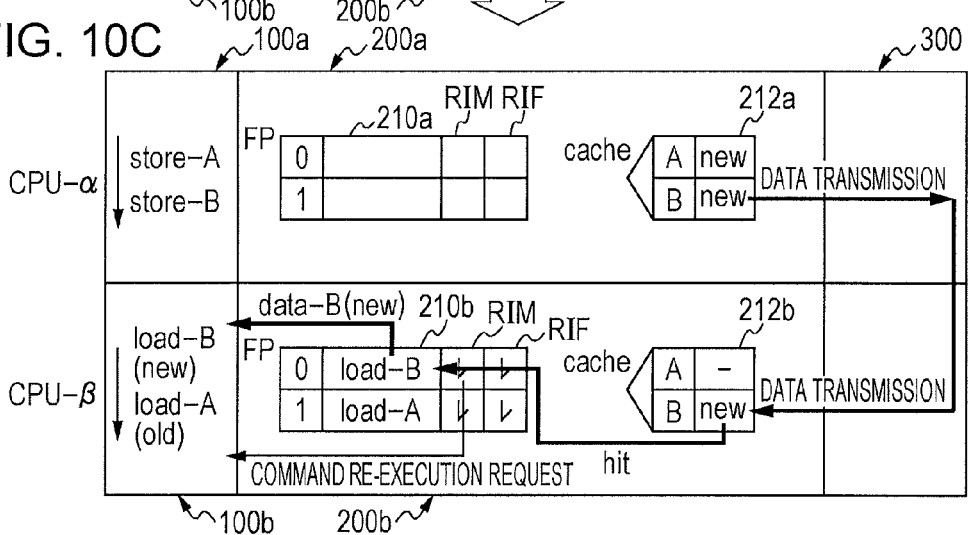

Since the data of the region B requested by the instruction load-B in the CPU-β is held by the CPU-α, as illustrated in FIG. 10C, the data (data-B (new)) updated by the instruction store-B is transmitted from the CPU-α to the CPU-β. In addition, this data (data-B (new)) is stored in the region B of the cache memory 212b in the CPU-β. At this time, in the primary cache control unit 200b of the CPU-β, the RIF flag is validated by the function of the RIF determination section 215. In other words, the RIF determination section 215 validates the RIF flags in all the valid entries (all the entries of valid=1) of the FP 210b, that is, flags indicating a possibility that data may be transmitted from another CPU (here, the CPU-α). In addition, the RIF flag indicates whether or not data is transmitted from another CPU and thus does not have to be information related to an entry. For example, a flag region may be provided independently from an entry of the FP, and the RIF flag may be set in the flag region. Alternatively, the RIF flag may be set in only an entry of the FP-TOQ which is next released.

As illustrated in FIG. 10C, the data (data-B (new)) stored in the region B of the cache memory 212b of the CPU-β is transmitted to the arithmetic unit 400 (the instruction control unit 100b) in response to the instruction load-B. At this time, when the process of the instruction load-B is completed, the instruction re-execution determination section 216 checks whether or not both the RIM flag and the RIF flag of FP#0 are in a valid state. In the example illustrated in FIG. 10C, these flags are in a valid state, and thus the instruction re-execution determination section 216 determines that there is a possibility of TSO violation and requests the instruction control unit 100 to re-execute an instruction.

As illustrated in FIG. 11A, in the CPU-β, the instruction load-A is re-executed by the instruction control unit 100 in response to the instruction re-execution request. That is to say, the instruction load-A of FP#1 which is a next instruction of the instruction load-B of FP#0 is executed again. However, in FIG. 11A, the instruction load-A first undergoes a cache miss, and the secondary cache control unit 300 is requested to transmit data to the region A. At this time, since the data corresponding to the instruction load-A is present in the CPU-α, as illustrated in FIG. 11B, the data (data-A (new)) updated by the instruction store-A is transmitted from the CPU-α to the CPU-β. This transmitted data (data-A (new)) is stored in the region A of the cache memory 212b in the CPU-β. Further, the updated data (data-A (new)) is transmitted to the arithmetic unit 400 (the instruction control unit 100b). Through the above operation, TSO violation described with reference to FIGS. 3A to 3C is solved.

However, there are cases where an excessive instruction re-execution request is issued depending on circumstances described below and thus a process performance is reduced in the primary cache control unit 200 having the function of avoiding the TSO violation described with reference to FIGS. 4 to 11B. That is to say, a plurality of N data items are registered in the same cache index in the N-way set associative cache. At this time, when an invalidation request is generated in relation to data of a certain way of a certain index due to instruction execution of another processor, there are cases where it is determined that there is a possibility of TSO violation although TSO is not inherently violated. If this determination is performed, an instruction re-execution process is unnecessarily performed, which is thus a factor of considerable performance reduction.

Figure 12:
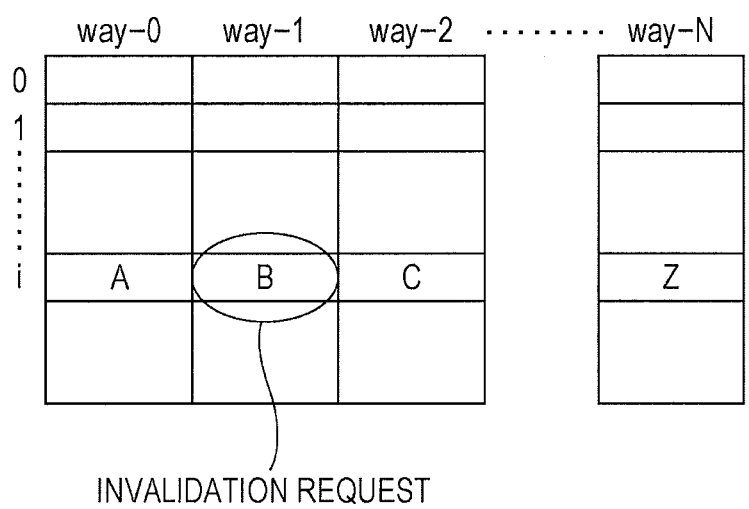
FIG. 12 is a diagram illustrating an example of the configuration of an N-way set associative cache memory.

FIG. 12 is a diagram illustrating an example of the configuration of an N-way set associative cache memory. In FIG. 12, the rows respectively correspond to indexes 0 to i, and the columns respectively correspond to N ways, way0 to wayN−1. N tags are provided so as to correspond to a single index, and thereby N data items can be stored.

Figure 7:
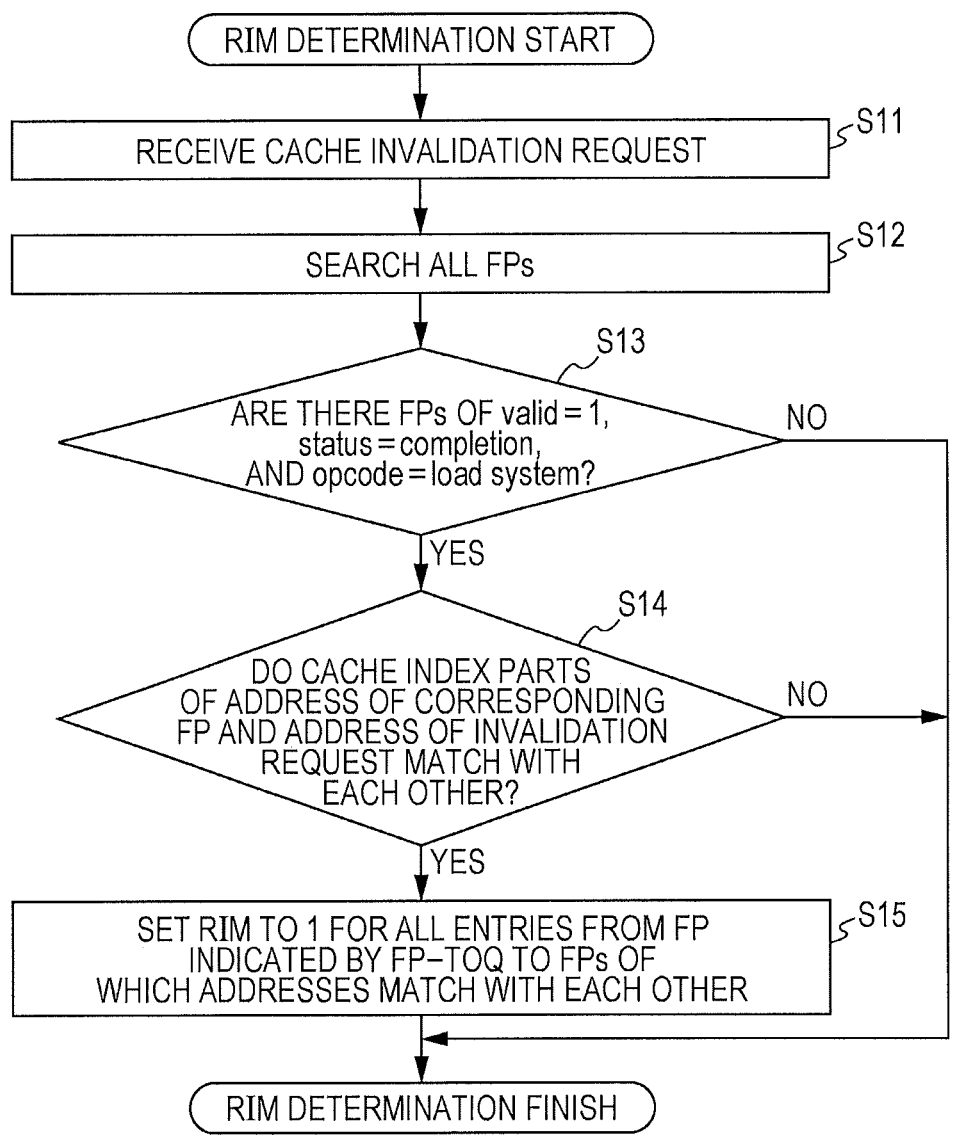
FIG. 7 is a method illustrating a determination operation performed by an RIM determination section.

As illustrated in the method of FIG. 7, as a condition for validating the RIM flag, a determination regarding whether an address of the cache index part held by an FP entry of which a load process is completed matches with an address of the cache index part of the invalidation process request is performed. Here, in a cache employing the N-way set associative method, there are N data items which are registered in the cache with the same cache index as target data of the invalidation process request (for example, B of FIG. 12). Therefore, in the address matching determination of only the index part, even in a case of an invalidation process request of data which is registered in the same cache index as data of which a load process is completed but is registered in a different way, the RIM flag is validated. As a result, excessive instruction re-execution is requested, and thus this causes performance to be reduced.

For example, in FIGS. 10A to 10C, it is assumed that the regions A and B of the cache memories 212a and 212b respectively have a single index, and two ways, way0 and way1, are provided for each index. In addition, it is assumed that target data of the load instruction load-A is data of the first way, way0, of the index A. Further, it is assumed that an invalidation request received by the CPU-β in FIG. 10B requests invalidation of data of the second way, way1, of the index A. In this case, since an address of the cache index part of FP#1 in which a process of the instruction load-A is completed matches with an address of the cache index part of the invalidation request, both the RIM flags of FP#0 and FP#1 are set to be valid when the invalidation request is received. In other words, the RIM flag is set to be valid although the data of the instruction load-A is not a target of the invalidation request. Thereafter, when a process of the instruction load-B is completed in FIG. 10C, since both the RIM flag and the RIF flag of FP#0 are in a valid state, it is determined that there is a possibility of TSO violation, and thus the instruction control unit 100 is requested to re-execute an instruction.

In the N-way set associative method, the larger the number of ways, the more the cases where the RIM flag is set by an inherently unrelated invalidation request. In other words, the larger the number of ways, the more the frequency in which an instruction is unnecessarily re-executed, and this causes a performance to be considerably reduced.

Hereinafter, in the N-way associative method, a description will be made of an arithmetic processing apparatus which decreases a frequency of occurrence of redundant instruction re-execution processes.

Figure 13:
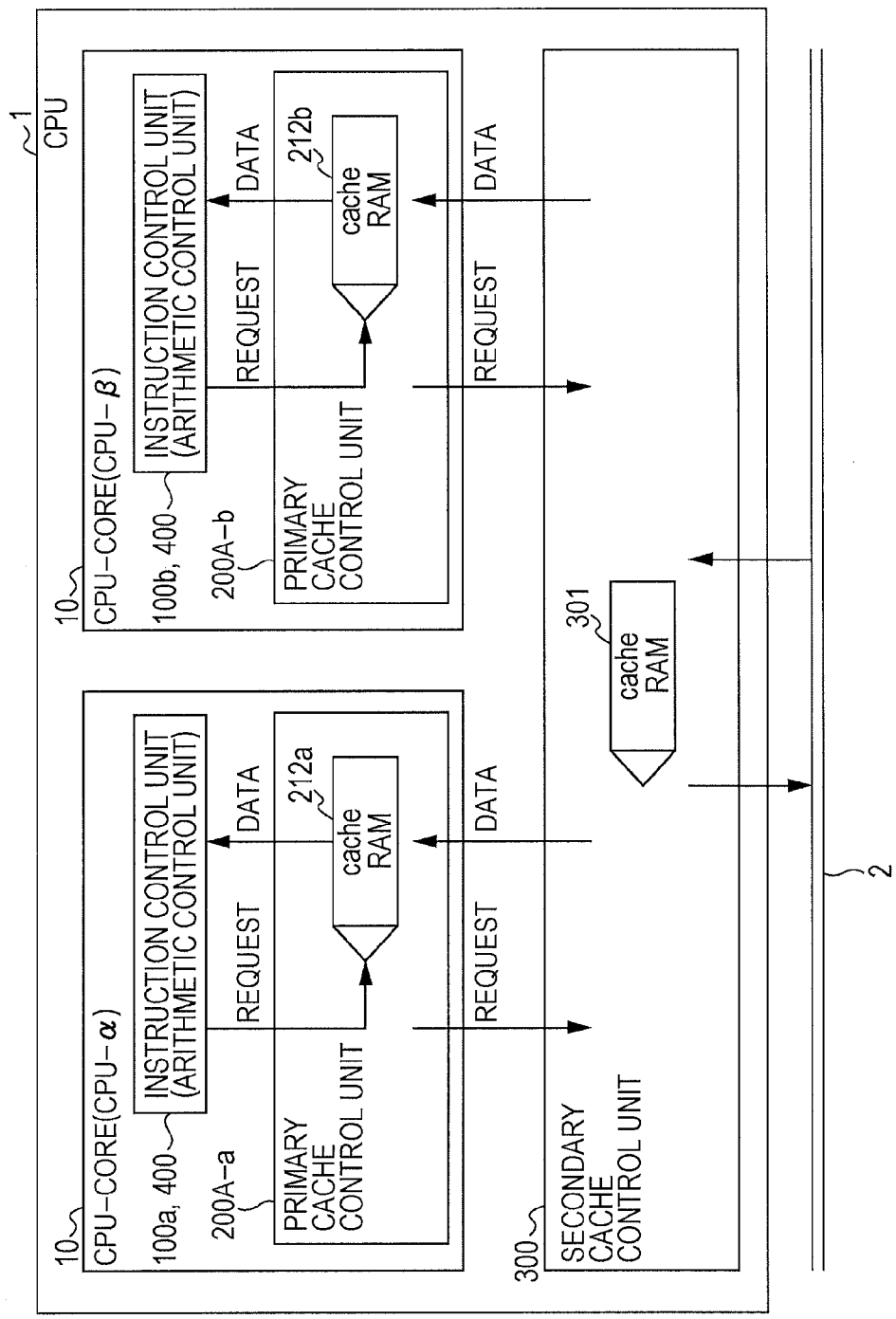
FIG. 13 is a block diagram illustrating an example of the configuration of an arithmetic central processing apparatus.

FIG. 13 is a block diagram illustrating an example of the configuration of an arithmetic processing apparatus (a CPU 1) employing a primary cache control unit 200A of this embodiment. In addition, in FIG. 13, the same reference numerals as the reference numerals described above indicate the same or substantially the same parts, and thus description thereof will be omitted. Further, in the subsequent description as well, the letter a is added to each reference numeral in order to specify a constituent element of the CPU-α, and the letter b is added to each reference numeral in order to specify a constituent element of the CPU-β. In a case where the CPU-α and the CPU-β do not have to be specified, the reference numerals are used without adding the letters a and b.

As illustrated in FIG. 13, the CPU 1 employing the primary cache control unit 200A of this embodiment uses a multi-processor configuration. That is to say, the CPU 1 includes CPU-COREs 10 (the CPU-α and the CPU-β) which are two processors, and the two CPU-COREs 10 commonly use the secondary cache control unit 300 of a lower hierarchy. In addition, each CPU-CORE 10 processes memory access out of order, and includes an instruction control unit 100, an arithmetic control unit 400 which is an arithmetic unit, and the primary cache control unit 200A. In addition, the CPU 1 (the secondary cache control unit 300) is connected to a system control bus 2 and is thus connected to a memory and the like so as to communicate therewith. Further, each primary cache control unit 200A includes a primary cache 212, and the secondary cache control unit 300 includes a secondary cache 301.

Figure 14A:
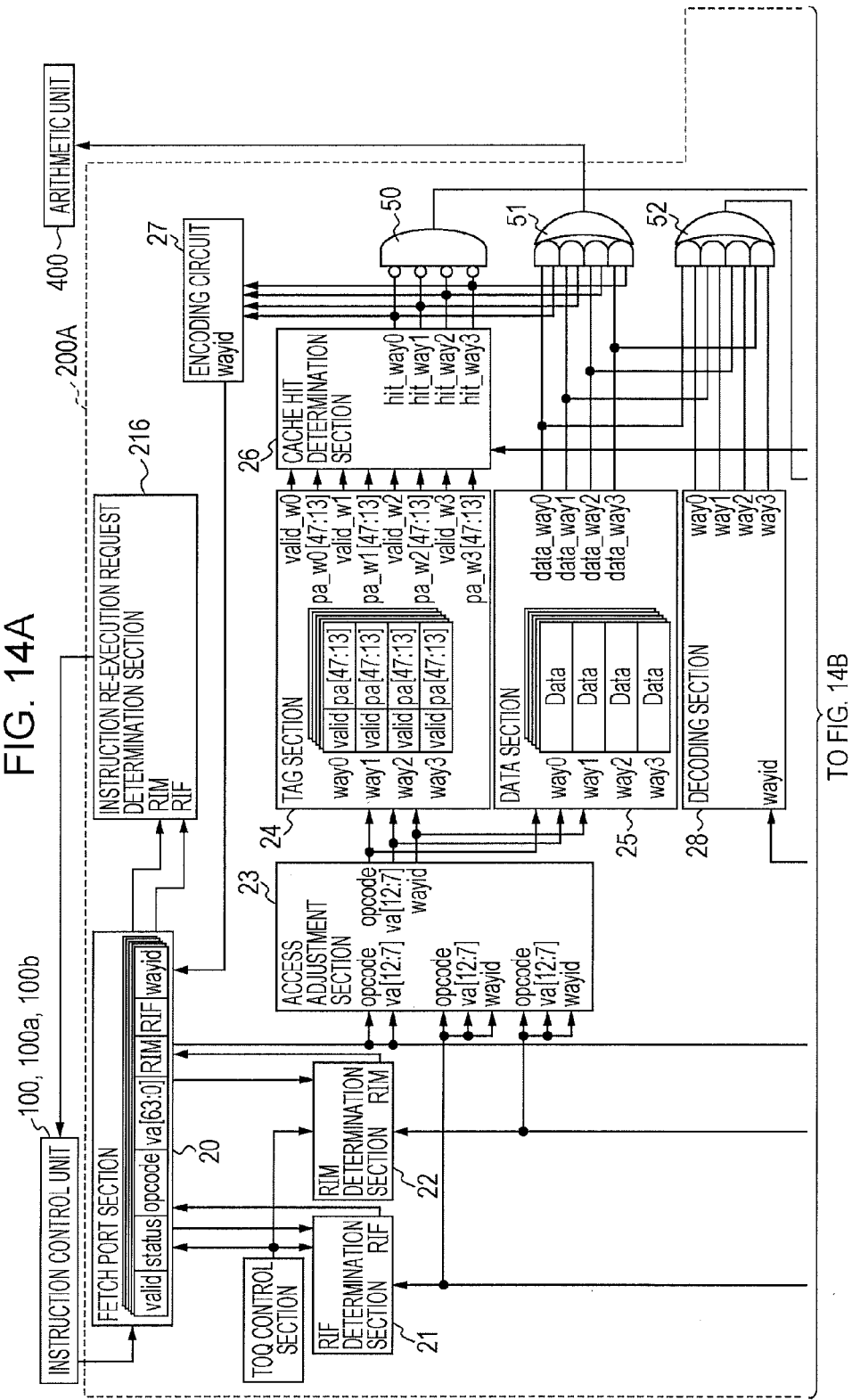
FIGS. 14A and 14B are diagrams illustrating an example of the configuration of the primary cache control unit and the secondary cache control unit.
Figure 14B:
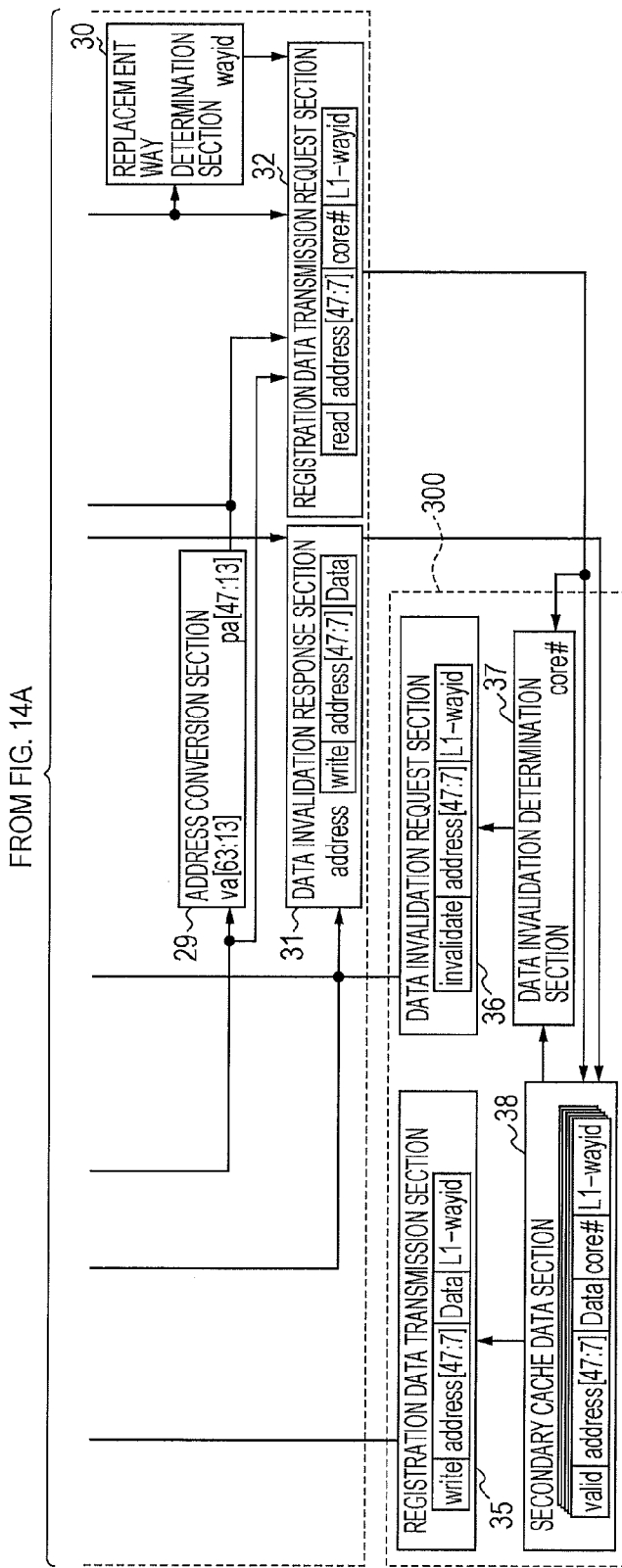

FIGS. 14A and 14B are diagrams illustrating an example of the configuration of the primary cache control unit 200A and the secondary cache control unit 300. In FIGS. 14A and 14B, the same constituent elements as in other drawings or corresponding constituent elements are referred to by the same or corresponding reference numerals, and description thereof will be omitted. In addition, in the cache control units of FIGS. 14A and 14B, it is assumed that a primary cache volume is 32 KB (four ways), a line size is 128 B, a page size is 8 KB, and a memory space is 256 TB. A bit number of each address illustrated in FIGS. 14A and 14B corresponds to this size. In addition, in FIGS. 14A and 14B, a logical address is indicated by va, and a physical address is indicated by pa.

In FIGS. 14A and 14B, the boundary between each functional block and other functional blocks indicated by the respective boxes basically indicates a functional boundary, and does not correspond to separation between physical positions, separation between electrical signals, control logical separation, or the like. Each functional block may be a single hardware module which is physically separated from other blocks to some degree, or may indicate a single function of hardware modules which are physically integrated with other blocks.

The primary cache control unit 200A of FIGS. 14A and 14B includes a fetch port section 20, an RIF determination section 21, an RIM determination section 22, an access adjustment section 23, a tag section 24, a data section 25, a cache hit determination section 26, an encoding circuit 27, a decoding circuit 28, and an address conversion section 29. The primary cache control unit 200A further includes a replacement way determination section 30, a data invalidation response section 31, a registration data transmission request section 32, and logical circuits 50 to 52. In addition, the secondary cache control unit 300 of FIGS. 14A and 14B includes a registration data transmission section 35, a data invalidation request section 36, a data invalidation determination section 37, and a secondary cache data section 38.

A cache access request from the instruction control unit 100 is temporarily held in the fetch port section 20 of the primary cache control unit 200A. A function and an operation of the fetch port section 20 are the same as those of the above-described FP 210. The fetch port section 20 holds a plurality of instructions accessing data of the cache memory, and the plurality of instructions are executed out of order and are released in order. Specifically, the access adjustment section 23 adjusts a request of which entry in the fetch port section 20 is processed. In order to guarantee the above-described TSO, the access adjustment section 23 guarantees that a subsequent store instruction does not bypass a preceding load instruction in an order of instructions to be processed, or a subsequent store instruction does not bypass a preceding store instruction, and enables a subsequent load instruction to bypass a preceding load instruction. In addition, the access adjustment section 23 selects the entries (request#n) of the fetch port section 20 one by one out of order, that is, at random, and makes a process of the instruction executed. Specifically, the access adjustment section 23 receives an index part va[12:7] corresponding from the seventh bit to the twelfth bit of the logical address va[63:0] with the 64-bit width and the opcode which are stored in the fetch port section 20, from the fetch port section 20. The access adjustment section 23 supplies the index part va[12:7] and the opcode of the selected execution target instruction to the tag section 24 and the data section 25 so as to execute a corresponding load instruction or store instruction.

In addition, the access adjustment section 23 adjusts access to the cache memory (the tag section 24 and the data section 25) in relation to the instruction of the fetch port section 20, a data registration request or an invalidation request received from the secondary cache control unit 300, and the like. When a certain instruction or request acquires priority through the adjustment in the access adjustment section 23, a process corresponding to the instruction or the request is executed for the cache memory.

The respective entries of the fetch port section 20 are sequentially released in order from the oldest entry. Here, the oldest entry of the valid entries is indicated by fetch-port-top-of-queue (FP-TOQ). In other words, an entry of the FP 210 which is not indicated by the FP-TOQ is not directly released even if a process of an instruction in the entry is completed. In addition, an entry which has been processed is released in an older order from an entry indicated by the FP-TOQ at a time point when a process of an instruction in the entry indicated by the FP-TOQ is completed.

Figure 16:
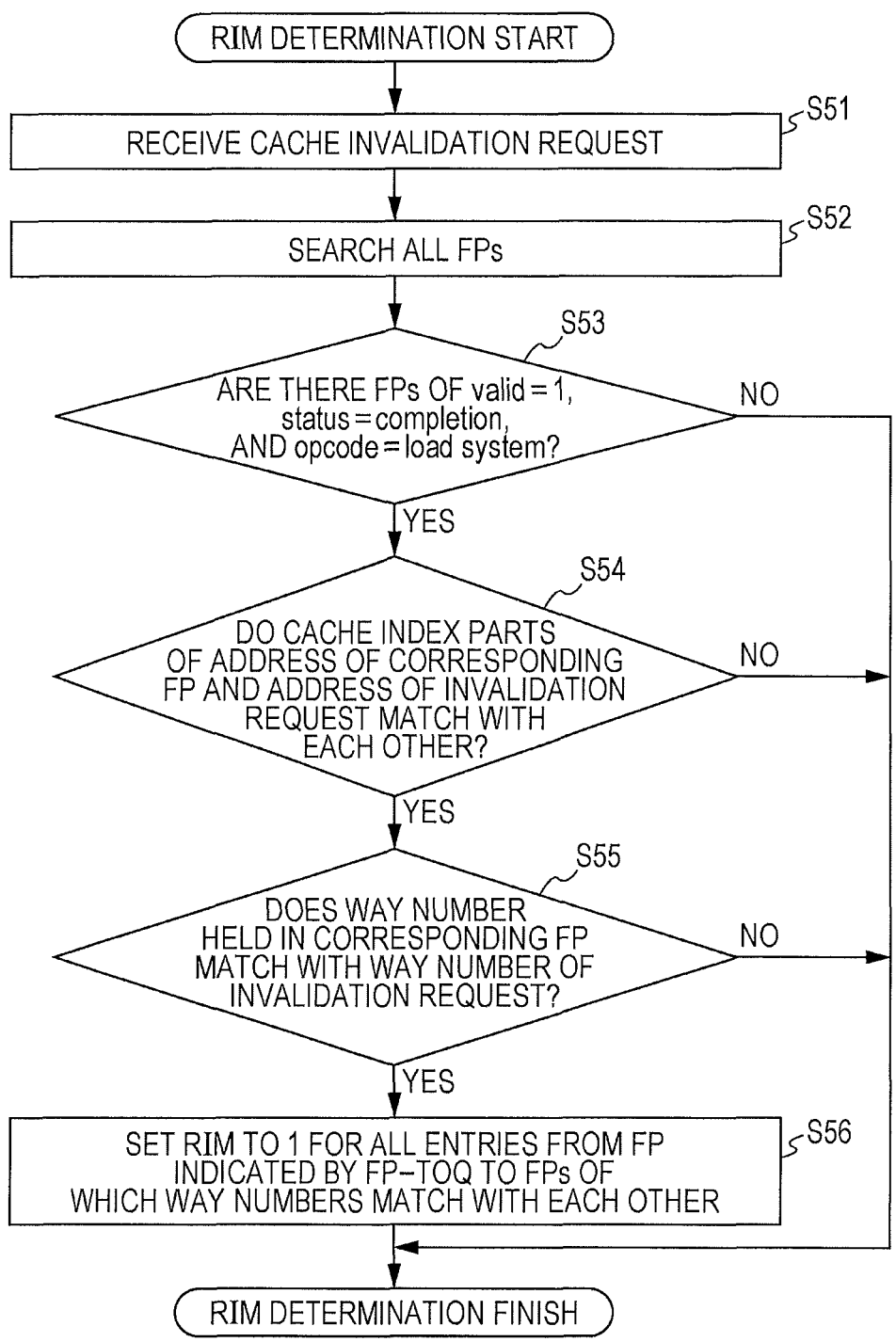
FIG. 16 is a method illustrating an example of the RIM determination process.

As a format of each entry of the fetch port section 20, that is, content of each entry, "wayid" which is a way ID is added in addition to the content illustrated in FIG. 6. The meaning of "valid", "status", "opcode", "address", "RIM", and "RIF" is the same as described above. However, validation of the RIM flag is executed by the RIM determination section 22. As described later, the validation process performed by the RIM determination section 22 is illustrated in FIG. 16 and is a little different from the process performed by the above-described RIM determination section 214. In addition, validation of the RIF flag is executed by the RIF determination section 21. The validation process performed by the RIF determination section 21 may be the same process performed by the above-described RIF determination section 215 and may be performed according to the method illustrated in FIG. 8. Further, as described above, the instruction re-execution determination section 216 may determine whether or not an instruction of a corresponding entry is executed again according to the method illustrated in FIG. 9.

The way ID "wayid" is data indicating a way ID (a way number) of a way in which data corresponding to an instruction of a corresponding entry is stored. Since a four-way set associative method is assumed in the circuit illustrated in FIGS. 14A and 14B, the way ID may have, for example, a 2-bit width for expressing four ways. Four ways from way0 to way3 may be respectively specified using values "00", "01", "10" and "11" of the way ID.

Figure 15:
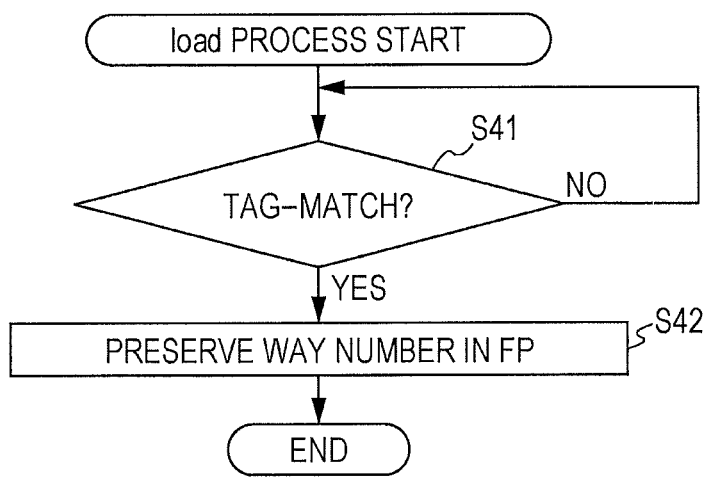
FIG. 15 is a method illustrating a method of setting a way ID.

FIG. 15 is a method illustrating a method of setting a way ID. When a load instruction held in the fetch port section 20 performs a cache hit through a process of the method, a way ID is registered in the fetch port section 20 in relation to the load instruction which has performed the cache hit.

Specifically, in step S41, it is determined whether or not a tag matches in a process of the load instruction held in the fetch port section 20. Specifically, the index part va[12:7] of the designated address va[63:0] (an address at which load target data is stored) of the load instruction which is a process target is supplied to the tag section 24 via the access adjustment section 23. The tag section 24 supplies the respective tags (pa_w0[47:13]) of four ways corresponding to the supplied index part va[12:7] to the cache hit determination section 26. In addition, the upper part va[63:13] of the index part va[12:7] of the designated address va[63:0] of the load instruction which is a process target is supplied to the address conversion section 29. The address conversion section 29 converts the supplied logical address into a physical address, and a portion thereof pa[47:13] is supplied to the cache hit determination section 26. The cache hit determination section 26 compares the respective tags of the four ways supplied from the tag section 24 with the physical address pa[47:13] supplied from the address conversion section 29 so as to determine matching or mismatching. The cache hit determination section 26 outputs hit signals hit_way0 to hit_way3 indicating matching or mismatching in the respective four ways. In the hit signals hit_way0 to hit_way3, the signal corresponding to the way in which the matching is determined becomes "1", and the signal corresponding to the way in which the mismatching is determined becomes "0".

If the tag matches in step S41 (that is, if the load instruction performs a cache hit), a way ID (a way number) of the way in which the matching is determined is registered in the fetch port section 20 in step S42. Specifically, the encoding circuit 27 receives the high signals hit_way0 to hit_way3 output from the cache hit determination section 26 as input signals, and encodes the input signals, thereby outputting a code (for example, a 2-bit code) indicating the hit way number. This code is stored in the fetch port section 20 as a way ID.

Referring to FIGS. 14A and 14B again, an operation of the primary cache control unit 200A will be further described. Although the tag hit when the load instruction is executed has been described above in the above description, the data section 25 outputs data items data_way0 to data_way3 of four ways corresponding to the index va[12:7] supplied from the access adjustment section 23 when the load instruction is executed. The data items are supplied to the logical circuit 51. The logical circuit 51 selects data of the way corresponding to "1" among the hit signals hit_way0 to hit_way3 output by the cache hit determination section 26 so as to be supplied to the arithmetic unit 400. That is to say, the data to be loaded by the load instruction is supplied to the arithmetic unit 400. In addition, when a store instruction is executed as well, the hit signals hit_way0 to hit_way3 are output from the cache hit determination section 26.

In a case where there is no signal of "1" among the hit signals hit_way0 to hit_way3 output from the cache hit determination section 26, that is, in a case of a cache miss, an output of the logical circuit 50 becomes 1, and the registration data transmission request section 32 is activated. The output of the logical circuit 50 is also supplied to the replacement way determination section 30, and thereby a process of ejecting replacement target data from the data section 25 is performed. The registration data transmission request section 32 transmits an instruction "read" indicating reading, a physical address "address [47:7]", a core number (a number for specifying which core), and a way ID of a way which registers data in the primary cache, as a registration data transmission request.

In the secondary cache control unit 300, data of the registration data transmission request transmitted by the registration data transmission request section 32 is stored in the secondary cache data section 38 and is also supplied to the data invalidation determination section 37. When the data of the registration data transmission request is supplied, the data invalidation determination section 37 searches for an entry of the secondary cache data section 38 which has an address matching with an address of the corresponding data. If there is an entry of which an address matches, the data invalidation determination section 37 notifies the data invalidation request section 36 so as to transmit an invalidation request to a core indicated by a core number of the entry. The data invalidation request section 36 transmits invalidation request data including "invalidate" indicating the invalidation request, an address "address [47:7]" of the invalidation target, and a way ID of a way of the invalidation target, to the corresponding core.

In the primary cache control unit 200A of the core which has received the invalidation request data, the RIM determination section 22 performs an RIM determination process. This RIM determination process will be described later. In addition, in the primary cache control unit 200A of the core which has received the invalidation request data, the access adjustment section 23 further invalidates data of the corresponding way of the corresponding index on the basis of the index part of the address and the way ID of the received invalidation request. Further, at this time, the data items data_way0 to data_way3 of the respective ways of the corresponding index are output from the data section 25. Furthermore, the decoding circuit 28 encodes the received way ID so as to generate signals way0 to way3 in which only the way indicated by the way ID is "1" and the other ways are "0". The logical circuit 52 selects data which is an invalidation target from the data items data_way0 to data_way3 output from the data section 25 on the basis of the signals way0 to way3, and supplies the selected data to the data invalidation response section 31. The data invalidation response section 31 transmits an instruction "write" indicating writing, a physical address "address [47:7]", and the data which is requested to be invalidated, as a data invalidation response.

In the secondary cache control unit 300, the data of the data invalidation response transmitted by the data invalidation response section 31 is stored in the secondary cache data section 38. In response to the fact that an instruction part of the data of the data invalidation response is "write", the registration data transmission section 35 transmits the registration data to a core which previously makes the registration data transmission request. Since the data of the registration data transmission request which is previously sent is stored in the secondary cache data section 38, a core number included in the data may be used to specify a core which has made the registration data transmission request. The registration data transmitted by the registration data transmission section 35 includes an instruction "write" indicating a writing, a physical address "address [47:7]", data which is returned in response to the data invalidation (registered data), and a way ID of a data registration destination.

Figure 8:
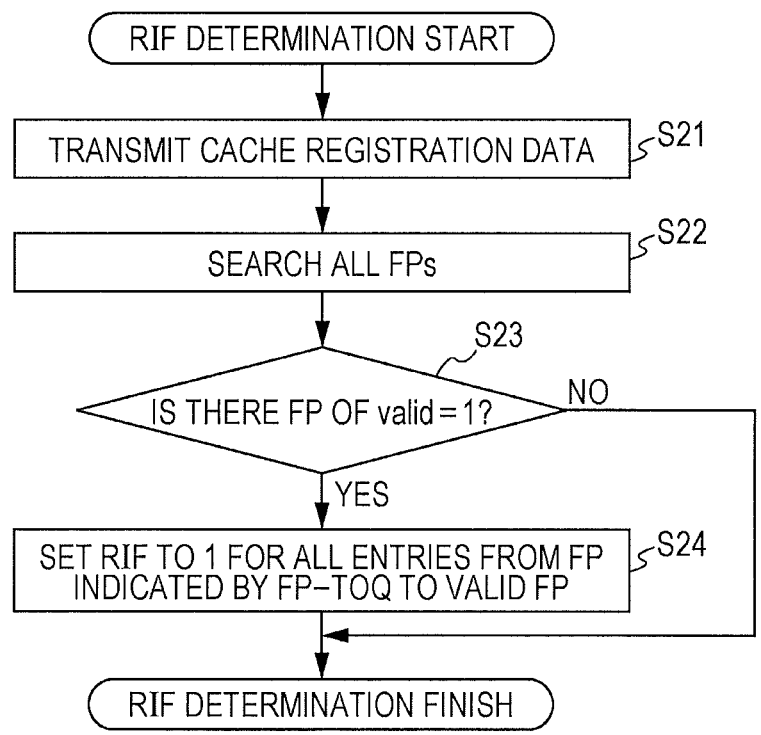
FIG. 8 is a method illustrating a determination operation performed by an RIF determination section.

In the primary cache control unit 200A of the core which has received the registration data, the RIF determination section 21 performs the RIF determination process illustrated in FIG. 8. In addition, in the primary cache control unit 200A of the core, which has received the registration data, the access adjustment section 23 further registers the data in the corresponding way of the corresponding index on the basis of the index part of the address and the way ID of the received registration data. In other words, the tag part of the address "address [47:7]" in the registration data is stored in the corresponding way of the corresponding index of the tag section 24. Further, the registration target data is stored in the corresponding way of the corresponding index of the data section 25.

FIG. 16 is a method illustrating an example of the RIM determination process. The RIM determination section 22 validates the RIM flag according to this method. First, the RIM determination section 22 receives an invalidation request of data of the cache memory in a state in which a load instruction held in the fetch port section 20 is completed and is not released. When the invalidation request is received, the RIM determination section 22 validates the RIM flag in a case where a cache index of a target address and a way ID of the received invalidation request match with a cache index of a designated address and a way ID of the load instruction.

Specifically, when the invalidation request to the cache memory is received from the secondary cache control unit 300 (step S51), the RIM determination section 22 searches all the entries of the fetch port section 20 (step S52). In addition, the RIM determination section 22 determines whether or not there is an entry of "valid=1", "status=completion", and "opcode=load system" in the fetch port section 20 (step S53). That is to say, it is determined whether or not the invalidation request of target data of the cache memory is received after the target data is transmitted from the cache memory to the arithmetic unit 400 in response to a load instruction held in the fetch port section 20 until the entry is released. If there is such an entry in the fetch port section 20, the flow proceeds to the YES route of step S53. The RIM determination section 22 determines whether or not a cache index part of an address of the corresponding entry matches with a cache index part of a target address of the invalidation request received from the secondary cache control unit 300 (step S54). If both the addresses match with each other (the YES route of S54), the RIM determination section 22 determines whether or not a way ID (a way number) of the corresponding entry of the fetch port section 20 matches with a way ID (a way number) of the received invalidation request (step S55). If both the way IDs (the way numbers) match with each other (the YES route of step S55), the RIM determination section 22 sets the RIM flag to "1" for all the entries from an entry indicated by the FP-TOQ to the corresponding entry (step S56). In other words, there are cases where target data is ejected from the cache memory by an invalidation request after the target data is transmitted to the arithmetic unit 400 by a load instruction held in a certain entry of the fetch port section 20 until the entry is released. In these cases, the RIM determination section 22 validates the RIM flag of the corresponding entry. Further, if there is no target entry in the fetch port section 20 (the NO routes of steps S53, S54 and S55), the RIM determination section 22 finishes the RIM determination process.

In addition, a target address of the invalidation request is a physical address and is issued by the instruction control unit 100, and a designated address of a load instruction held in the fetch port section 20 is a logical address. However, an index part which is a lower bit of the address is the same regardless of a physical address or a logical address. Therefore, there is no problem in comparing the index parts as they are without address conversion of an address between a target address of the invalidation request and a designated address of the load instruction held in the fetch port section 20. Similarly, there is no problem in selecting an index of the tag section 24 or the data section 25 on the basis of the index part as it is of the target address of the invalidation request without address conversion.

However, when matching in an upper address of the index is intended to be detected in order to reduce the frequency of occurrence of redundant instruction re-execution processes, since a logical address is different from a physical address in an address of the upper part, comparison may not be performed without conversion. When an invalidation process request is received, logical addresses of all the valid entries held in the fetch port section 20 are converted into physical addresses one by one by the address conversion section 29, so as to determine whether or not the converted physical address matches with a physical address indicated by the invalidation process request. However, in this configuration, it takes time to read all the valid entries of the fetch port section 20 and, further, a performance is reduced due to pipeline occupation for performing address conversion. Moreover, a circuit scale increases since a bit width (six bits in this embodiment) of an index is not only compared but 35 bits of the physical address pa[47:13] are also compared. A physical address may be held in the fetch port section 20 in order to avoid this problem; however, the size of the fetch port section 20 increases in this method. In this embodiment, since a way ID has two bits, if the number of entries of the fetch port section 20 is set to sixteen, 32 bits have to be used to detect matching. On the other hand, in a case where a physical address is registered in an entry, since the physical address is formed by 35 bits, if the number of entries of the fetch port section 20 is set to sixteen, 560 bits have to be used to detect matching.

In light of the above-described problems, in this embodiment, attention is paid to a way ID, and RIM determination is performed by detecting matching of a cache index part and a way ID. By the use of the way ID in this way, in the primary cache where a logical address and a physical address are mixed, it is possible to efficiently perform the RIM determination even without converting a target address of an invalidation request from a physical address to a logical address.

Figure 17:
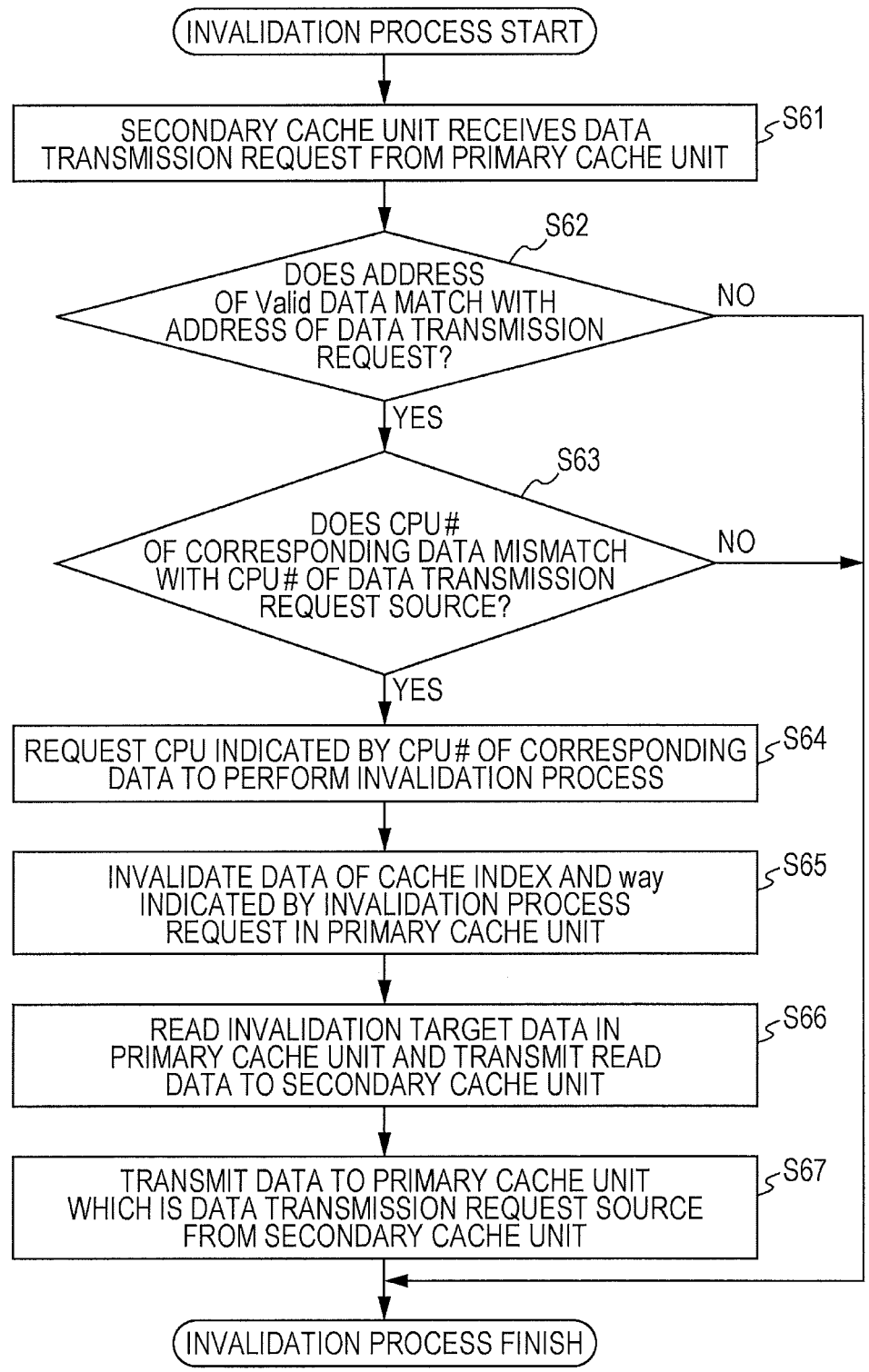
FIG. 17 is a method illustrating a flow of an invalidation process.

FIG. 17 is a method illustrating a flow of the invalidation process. According to the flow of the invalidation process, for example, the invalidation request illustrated in FIG. 1013 is issued, and a process associated therewith is performed. Hereinafter, with reference to FIG. 17, an operation of the invalidation process performed by the circuit of FIGS. 14A and 14B will be described.

In step S61, the secondary cache unit 300 receives a data transmission request from the registration data transmission request section 32 of the primary cache control unit 200A. In step S62, the data invalidation determination section 37 determines whether or not an address of valid data (an entry indicating "valid=1") stored in the secondary cache data section 38 matches with an address of the received data transmission request. If the addresses do not match with each other (in a case of negative determination (NO)), the invalidation process finishes.

If the addresses match with each other (in a case of affirmative determination (YES)) in step S62, it is determined in step S63 whether or not a CPU number (a core number "core #") of the corresponding data in which the addresses match with each other does not mismatch with a CPU number (a core number "core #") of the data transmission request. This determination is performed by the data invalidation determination section 37. In addition, the CPU number of the data stored in the secondary cache data section 38 indicates that the corresponding data is registered in the primary cache control unit 200A of the CPU core indicated by the CPU number. If the CPU numbers do not mismatch with each other (in a case of negative determination (NO)), the invalidation process finishes.

If the CPU numbers mismatch with each other in step S63 (in a case of affirmative determination (YES)), in step S64, the data invalidation request section 36 transmits an invalidation process request to the CPU core indicated by the CPU number (core number) of the corresponding data in which the addresses match with each other. In step S65, in the primary cache control unit 200A which receives the invalidation process request, data in which a cache index of the address and a way ID of the invalidation process request match is invalidated. In step S66, the data which is an invalidation target is read from the data section 25 of the primary cache control unit 200A, and the read data is transmitted to the secondary cache control unit 300 via the data invalidation response section 31. In step S67, the secondary cache control unit 300 which receives the transmitted data sends the received data to the primary cache control unit 200A which is a data transmission request source.

Although the arithmetic processing apparatus which reduces the frequency of occurrence of redundant instruction re-execution processes in the N-way set associative method has been described based on the embodiment, the invention is not limited to the embodiment and may be variously modified within the scope disclosed in the claims. For example, the number of ways, the width of an address, a form of each data item, details of information included in each data item, a detailed configuration or operation for realizing a desired function, and the like are not limited to the embodiment, and may be changed depending on the specification when being mounted within the scope disclosed in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An arithmetic processing apparatus comprising:
    a plurality of processors in which each of the plurality of processors has an arithmetic unit and a cache memory; at least one of the plurality of processors further including:
    an instruction port that holds a plurality of instructions accessing data of the cache memory, the plurality of instructions being executed out of order and being released in order;
    a first determination unit that receives an invalidation request for data in the cache memory in a state in which a load instruction held in the instruction port is completed and is not released, and validates a first flag when a cache index of a target address and a way ID of the received invalidation request match with a cache index of a designated address and a way ID of the load instruction;
    a second determination unit that validates a second flag when target data is transmitted due to a cache miss after a load instruction held in the instruction port undergoes the cache miss; and
    an instruction re-execution determination unit that instructs re-execution of an instruction subsequent to the load instruction held in the instruction port when both the first flag and the second flag are validated at the time of completion of an instruction held in the instruction port.

2. The arithmetic processing apparatus according to claim 1, wherein the target address of the invalidation request is a physical address, the designated address of the load instruction held in the instruction port is a logical address, and the first determination unit performs determination without converting the target address of the invalidation request from a physical address to a logical address.

3. The arithmetic processing apparatus according to claim 1, wherein, when a load instruction held in the instruction port performs a cache hit, a way ID is registered in the instruction port in relation to the load instruction which has performed the cache hit.

4. The arithmetic processing apparatus according to claim 1, wherein the first flag and the second flag are held for each instruction held in the instruction port.

5. A cache memory control device including a cache memory and an instruction port that holds a plurality of instructions accessing data of the cache memory, the plurality of instructions being executed out of order and being released in order, and controlling the cache memory, the cache memory control device comprising:
    a first determination unit that receives an invalidation request for data in the cache memory in a state in which a load instruction held in the instruction port is completed and is not released, and validates a first flag when a cache index of a target address and a way ID of the received invalidation request match with a cache index of a designated address and a way ID of the load instruction;
    a second determination unit that validates a second flag when target data is transmitted due to a cache miss after a load instruction held in the instruction port undergoes the cache miss; and
    an instruction re-execution determination unit that instructs re-execution of an instruction subsequent to the load instruction held in the instruction port when both the first flag and the second flag are validated at the time of completion of an instruction held in the instruction port.

6. The cache memory control device according to claim 5, wherein the target address of the invalidation request is a physical address, the designated address of the load instruction held in the instruction port is a logical address, and the first determination unit performs determination without converting the target address of the invalidation request from a physical address to a logical address.

7. The cache memory control device according to claim 5, wherein, when a load instruction held in the instruction port performs a cache hit, a way ID is registered in the instruction port in relation to the load instruction which has performed the cache hit.

8. The cache memory control device according to claim 5, wherein the first flag and the second flag are held in an entry of the instruction port.

9. A cache memory control method comprising:
    receiving an invalidation request for data in a cache memory in a state in which a load instruction held in an instruction port in which a plurality of instructions accessing data of the cache memory are held and the plurality of instructions are executed out of order and are released in order is completed and is not released, and validating a first flag when a cache index of a target address and a way ID of the received invalidation request match with a cache index of a designated address and a way ID of the load instruction;
    validating a second flag when target data is transmitted due to a cache miss after a load instruction held in the instruction port undergoes the cache miss; and
    instructing re-execution of an instruction subsequent to the load instruction held in the instruction port when both the first flag and the second flag are validated at the time of completion of an instruction held in the instruction port.

* * * * *